(12) United States Patent
Beck

(10) Patent No.: US 8,137,043 B2
(45) Date of Patent: Mar. 20, 2012

(54) DEVICE FOR OPENING AND CLOSING THE DISCHARGE DOOR OF A BULK SEED BOX

(76) Inventor: Tom J. Beck, Clarks, NE (US)

( * ) Notice: Subject to any disclaimer, the term of this patent is extended or adjusted under 35 U.S.C. 154(b) by 793 days.

(21) Appl. No.: 12/231,735

(22) Filed: Sep. 5, 2008

(65) Prior Publication Data

US 2009/0064807 A1 Mar. 12, 2009

Related U.S. Application Data

(60) Provisional application No. 60/993,169, filed on Sep. 10, 2007.

(51) Int. Cl.
*B65G 65/04* (2006.01)
*B65G 65/34* (2006.01)
*E05F 1/00* (2006.01)
*E05F 3/00* (2006.01)
*E05F 11/00* (2006.01)

(52) U.S. Cl. .............. 414/414; 49/324; 49/358; 49/360; 49/449; 49/452; 49/453; 49/504; 49/505

(58) Field of Classification Search .................. 414/328, 414/329, 414, 403; 49/324, 354, 357, 358, 49/360–362, 372, 404, 413, 449, 452–459, 49/504, 505; 111/174, 170, 130–133, 11–13
See application file for complete search history.

(56) References Cited

U.S. PATENT DOCUMENTS

| 5,094,356 | A | | 3/1992 | Miller | |
|---|---|---|---|---|---|
| 5,845,799 | A | | 12/1998 | Deaton | |
| 5,975,830 | A | * | 11/1999 | Goodrich et al. | 414/541 |
| 6,010,022 | A | | 1/2000 | Deaton | |
| 6,543,848 | B1 | * | 4/2003 | Suga et al. | 297/344.24 |
| 7,086,342 | B2 | | 8/2006 | O'Neall et al. | |
| 2001/0048872 | A1 | * | 12/2001 | Sardonico | 414/556 |
| 2006/0177292 | A1 | * | 8/2006 | Walker | 414/422 |

* cited by examiner

*Primary Examiner* — Christopher J. Novosad
(74) *Attorney, Agent, or Firm* — Dennis L. Thomte; Thomte Patent Law Office LLC

(57) ABSTRACT

A device is described for opening and closing the discharge door of a bulk seed box. The device comprises a portable lightweight structure which is attached to the box and which uses an electrically operated screw actuator to move the discharge door of the box from its closed position to its open position and vice versa. The device also includes a spreader mechanism which relieves the stress or tension on the supporting slide or track for the discharge door so that the discharge door may be more easily opened and closed.

20 Claims, 4 Drawing Sheets

DEVICE FOR OPENING AND CLOSING THE DISCHARGE DOOR OF A BULK SEED BOX

This application claims the benefit of the provisional application entitled DEVICE FOR OPENING AND CLOSING THE DISCHARGE DOOR OF A BULK SEED BOX, Ser. No. 60/993,169, filed Sep. 10, 2007.

BACKGROUND OF THE INVENTION

1. Field of the Invention

This invention relates to a device for opening and closing the discharge door of a bulk seed box and more particularly to a device which utilizes an electrically operated screw actuator to open and close the discharge door.

2. Description of the Related Art

Bulk seed systems have been in wide use for many years to eliminate the need for filling row planter boxes and grain drills with seed from individual bags. A popular type of bulk seed box is that which is manufactured by Buckhorn, Inc. of Milford, Ohio, who is the owner of U.S. Pat. Nos. 5,845,799 and 6,010,022 relating to bulk boxes. Pioneer Hi-Bred International, Inc. of Johnston, Iowa, markets agricultural seeds in large bulk boxes under the registered trademark PROBOX®. See also U.S. Pat. Nos. 5,094,356 and 7,086,342 which disclose bulk seed boxes having discharge doors or slide gates.

The bulk seed boxes of Buckhorn, Inc. and Pioneer have a sliding discharge door at the lower ends thereof through which the seed in the bulk box is dumped into a seed system, wagon, truck, etc. When the large bulk seed boxes are delivered to a farmer or the like, the bulk seed box is normally elevated above the ground by means of a forklift or a front end loader so that the contents of the bulk seed box may be dumped into a seed system/wagon/truck so that the seed may be conveyed therefrom into the planting devices. The fact that the bulk boxes are elevated above the truck or the like requires that a person climb upwardly on the truck or a ladder to manually open the discharge door. Further, the weight of the seed in the box sometimes causes the seed box to slightly deform which makes it extremely difficult to manually open or close the discharge door.

SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

A device for opening and closing the discharge door of a bulk seed box is disclosed which includes a lightweight portable device which is removably secured to the lower end of the seed box while the seed box is on the ground or other suitable supporting surface. The device of this invention is selectively removably inserted into openings in the lower end of the bulk seed box at opposite sides of the discharge door. The device includes an electrically operated screw actuator which has a support mounted on the outer end of the actuator rod thereof which includes a claw-like member thereon which is connected to the discharge door and which will pull the discharge door from its closed position to its open position as the actuator rod of the screw actuator is retracted. The support also includes a generally C-shaped portion which is brought into engagement with the outer end of the discharge door and which will push the discharge door from its open position to its closed position upon extension of the actuator rod of the screw actuator.

The device also includes a spreader means thereon which may be used to relieve stress on the slide supports for the discharge door so that the discharge door may be more easily moved between its closed and open positions. The device may be remotely controlled which eliminates the need for a person to climb up a truck or ladder to manually operate the discharge door.

It is therefore a principal object of the invention to provide a device for opening and closing the discharge door of a bulk seed box.

A further object of the invention is to provide a device of the type described which includes an electrically operated screw actuator for moving the discharge door of the bulk seed box between its closed and open positions and vice versa.

Still another object of the invention is to provide a device for opening and closing the discharge door of a bulk seed box which may be remotely operated.

Still another object of the invention is to provide a device for opening and closing the discharge door of a bulk seed box which includes a spreader device for relieving the stress between the discharge door and its support slides.

Yet another object of the invention is to provide a device for opening and closing the discharge door of a bulk seed box which is portable and lightweight.

These and other objects will be obvious to those skilled in the art.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DESCRIPTION OF THE PREFERRED EMBODIMENT

Figure 1:
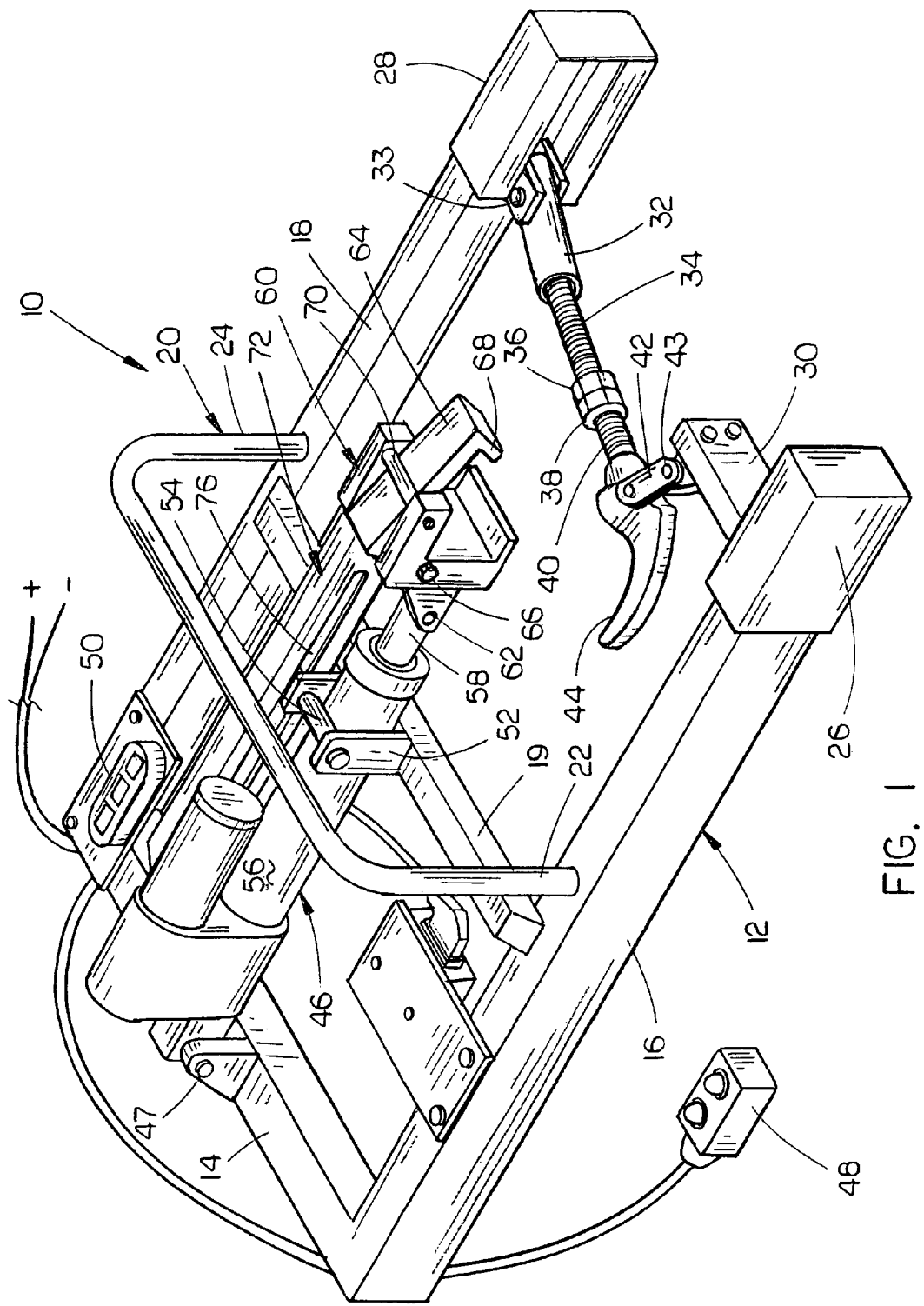
FIG. 1 is a front perspective view of the device of this invention.

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

The numeral 10 refers to the door opening and closing device of this invention which is designed to open and close the sliding discharge door of a bulk seed box such as disclosed in U.S. Pat. Nos. 6,010,022 and 5,845,799, the disclosures of which are incorporated by reference thereto. In the '022 patent, the sliding door is identified as a cutoff device 50 which selectively closes the outlet 60 in the bottom wall of the base. In the '799 patent, the sliding discharge door is referred to as a cutoff device or flow control valve 89.

Device 10 includes a horizontally disposed generally U-shaped frame 12 having a base portion 14 and horizontally spaced-apart legs 16 and 18 extending from the opposite ends thereof. A cross-brace 19 is secured to and extends between legs 16 and 18, as seen in the drawings. A generally U-shaped handle 20 has its leg portions 22 and 24 secured to legs 16 and 18, respectively, to provide a convenient means for carrying and positioning the device 10.

Enlarged foot portions 26 and 28 are secured to the free ends of legs 18 1and 20 by welding or the like. Bracket 30 is secured to foot portion 26 at the inner side thereof and extends horizontally towards foot portion 28. An internally threaded sleeve 32 is pivotally connected, about a vertical axis, to the foot portion 28 by a pivot pin 33 and has externally threaded bolt or stud 34 threadably received therein. The outer end of stud 34 is threadably received within nut 36 which is welded to nut 38. The effective combined length of studs 34 and 40 may be selectively changed by threadably rotating stud 34 inwardly or outwardly with respect to nut 36 and by threadably rotating stud 40 inwardly or outwardly with respect to nut 38.

A linkage 42 has one end thereof pivotally connected to bracket 30 about a vertically disposed pivot pin 43 and has its other end pivotally secured to a cam or over-center lever 44 by pivot pin 55 to enable foot portions 26 and 28 to be spread apart as will be discussed hereinafter.

Figure 3:
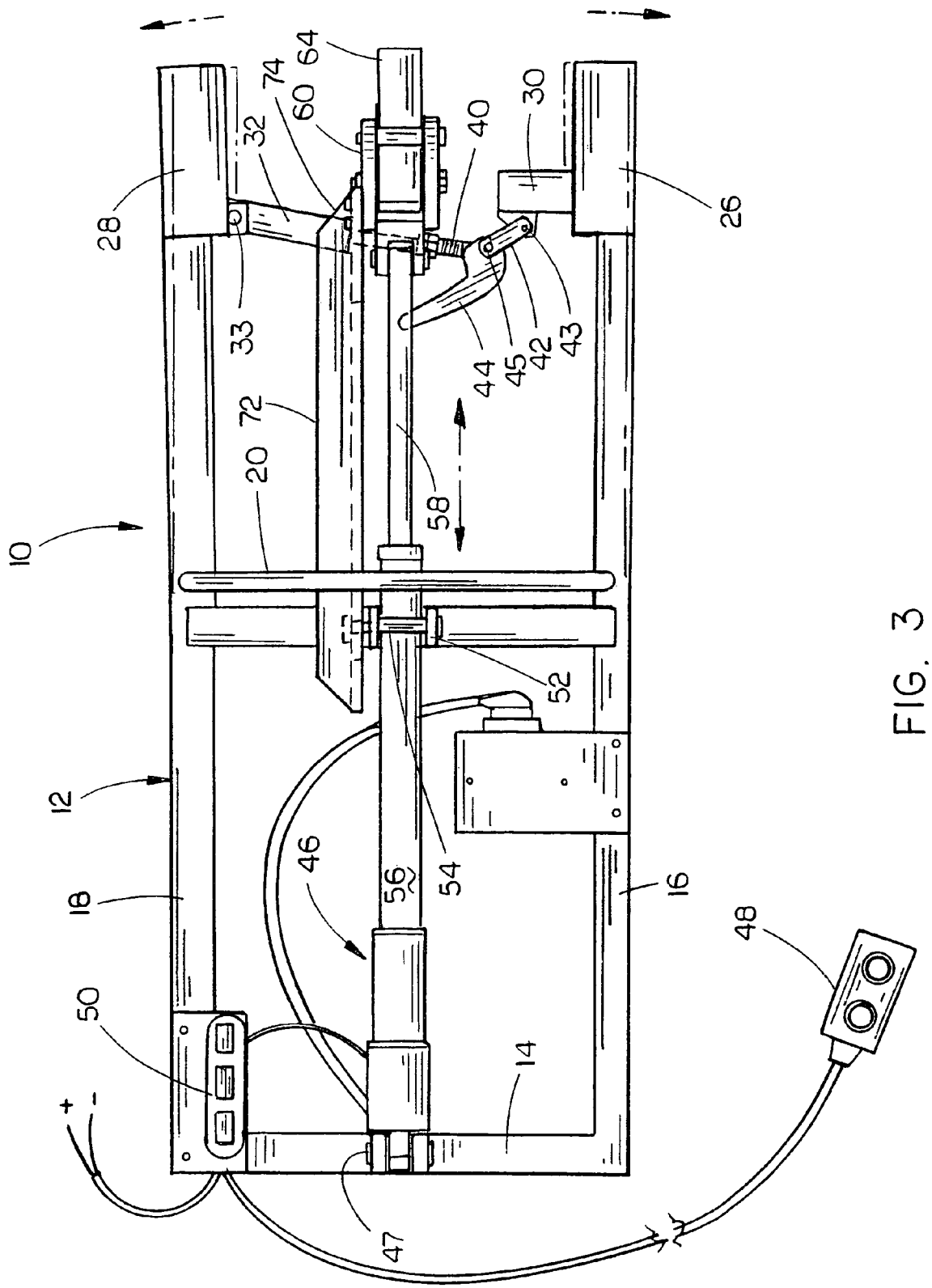
FIG. 3 is a top view similar to FIG. 2 except that the screw actuator has been extended and the inner ends of the side frames of the device having been spread outwardly to relieve stress on the sliding discharge gate.

The numeral 46 refers to a conventional screw actuator mechanism which may be driven by a 12-volt D.C. motor. Mechanism 46 will either utilize a self-contained 12-volt battery or a connecting cable extending to the electrical system of a forklift or tractor. The mechanism 46 may be used with a remote control 48 or a simple on/off controller 50 mounted on the frame 12. One end of mechanism 46 is pivotally secured to the base portion 14 of frame 12 by pivot pin 47. A bracket 52 is secured to cross-brace 19 and has a pin 54 extending between the upper ends of the legs of the bracket 52, as seen in the drawings. As seen in FIG. 3, one end of pin 54 extends laterally outwardly of bracket 52. The body portion 56 of mechanism 46 is positioned in bracket 52 below pin 54, as seen in FIG. 1.

The actuator rod 58 of mechanism 46 has a generally C-shaped support 60 secured thereto by pin 62. A claw or latch 64 is pivotally secured to support 60 by pin 66. The outer end of latch 64 has a downwardly extending latch portion 68. A spring is operatively associated with latch 60 to yieldably urge the outer end of latch 60 downwardly into the latching position seen in FIG. 1. A pin 70 is secured to support 60 and extends over latch 64 to limit the upward movement thereof.

An elongated angular guide or support 72 has its forward end secured to support 60 by bolts or screws 74. The side of support 72 has an elongated slot 76 formed therein which receives the protruding end of pin 54. A retainer 78 is secured to the end of pin 54 to maintain the protruding end of pin 54 in slot 76.

Figure 4:
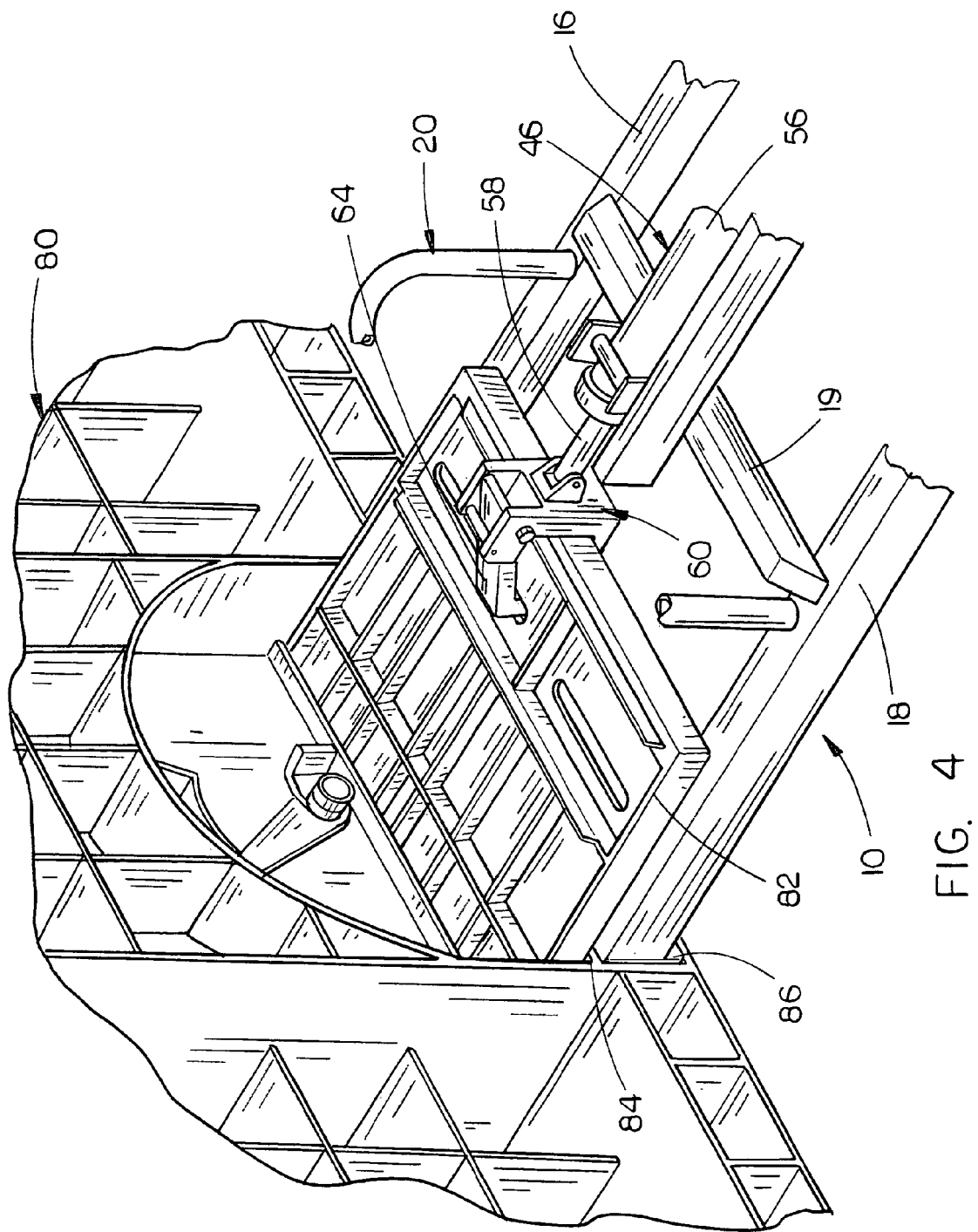
FIG. 4 is a partial perspective view illustrating a portion of a bulk seed box and the device of this invention.

The bottom portion of a typical bulk seed box or container 80 is partially shown in FIG. 4 and includes a discharge door 82 which is slidably positioned on a pair of horizontally spaced guide rails 84 in conventional fashion. Box 80 also has a pair of spaced-apart openings 86 formed therein.

Figure 2:
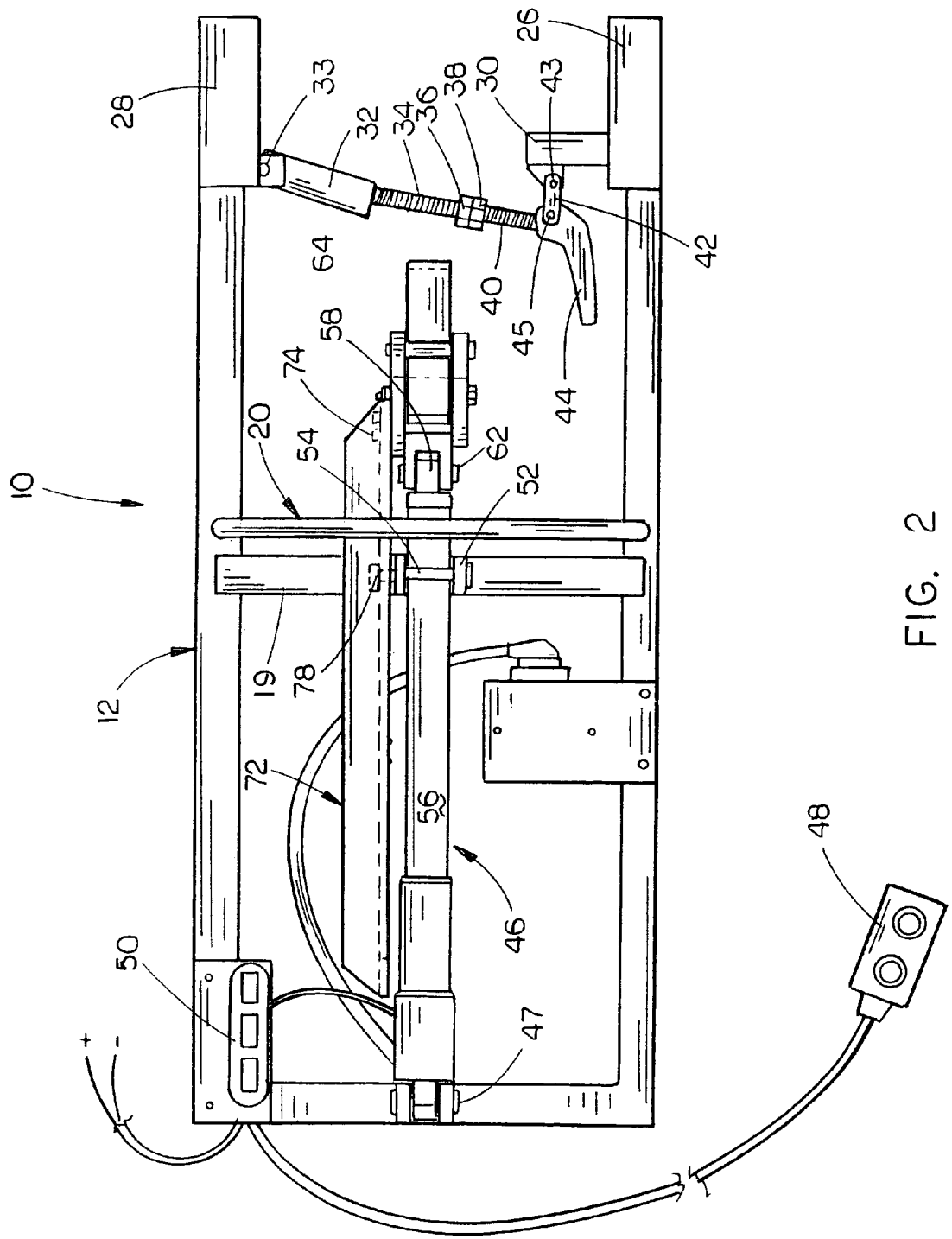
FIG. 2 is a top view of the device of this invention with the screw actuator in its retracted position.

In use, the components of the device 10 will normally be in the position illustrated in FIG. 2 prior to it being attached to the bulk seed container or box 80. The lever 44 will be in the position as seen in FIG. 2 which enables the foot portions 26 and 28 to be inserted into the openings 86 at the side of the container on opposite sides of the sliding discharge gate or door 82. This step is normally accomplished while the bulk seed box 80 is positioned on the ground or suitable supporting surface. Once the foot portions 26 and 28 have been inserted into the openings 86 in the box 80, the lever 44 is pivotally moved from its position of FIG. 2 to its position of FIG. 3 so that the foot portions 26 and 28 are spread slightly outwardly which tends to relieve the binding forces between the sliding discharge gate or door 82 and its supporting track or slides 84.

The bulk box 80 with the device 10 attached thereto will then be lifted by a forklift or front end loader to position the box over a seed system, wagon or truck. The screw actuator mechanism 46 is then controlled by either the controller 48 or the controller 50. The device will only work after the locking device on the box has been pivotally moved out of the way. The actuator rod 58 of the mechanism 46 is then extended which causes the support 60 and the latch 64 to move inwardly with respect to the bulk box 80 until the outer end of the discharge door 82 is received within the generally C-shaped opening at the forward end of the support 60. At that time, the latch 64 will pivotally move downwardly from its normally horizontally disposed position so that the latch portion 68 moves downwardly into the hand pull area 88 of the gate 82. Once the latch portion 68 is received in the hand pull area 88, the screw actuator mechanism 46 is retracted or reversed which causes the latch 64 to pull the sliding discharge door 82 outwardly with respect to the box so that the door 82 is moved from its closed position to its open position. When it is desired to close the discharge door 82, the screw actuator is actuated so that the support 60 pushes the door or gate 82 gate inwardly from its open position to its closed position.

When the box 80 has been emptied or the desired amount of seed has been discharged therefrom, the box with the device 10 will then be lowered onto the ground. The device 10 may then be removed, after the spreading forces on the foot portions 26 and 28 have released.

Thus it can be seen that a novel device has been provided for opening and closing the discharge door of a bulk seed box which eliminates the need of a person climbing up on a ladder or truck to manually force the discharge gate open or closed. The device of this invention may be operated remotely from the device so that the person does not have to position himself or herself beneath the bulk seed box which will normally be positioned over a truck or the like.

Thus it can be seen that the invention accomplishes at least all of its stated objectives.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

The invention claimed is:

1. A hand-held device for opening and closing a discharge door, having an inner end, an outer end, and opposite sides, which is horizontally slidably mounted at the lower end of a bulk seed box with the seed box having an opening formed therein at each of the opposite sides of the discharge door adjacent the outer end thereof, the discharge door being movable between closed and open positions, comprising:

a horizontally disposed generally U-shaped frame having an elongated base portion with horizontally spaced-apart first and second legs extending from the opposite ends of said base portion;

each of said legs having free ends spaced from said base portion;

said free ends of said legs adapted to be inserted into the openings on the seed box at the sides of the sliding discharge door;

a selectively operable spreader mechanism secured to and extending between said legs adjacent said free ends thereof;

an electrically powered screw actuator mechanism mounted on said frame which includes an actuator rod which is parallel to said legs and which is movable between extended and retracted positions;

said actuator rod having an outer end; and discharge door engagement structure at said outer end of said actuator rod for selective engagement with the outer end of the discharge door whereby retraction of said actuator rod will cause the discharge door to be slidably moved to said open position and so that extension of said actuator rod will cause the discharge door to be moved to said closed position.

2. The device of claim 1 wherein said free ends of said legs have enlarged foot portions.

3. The device of claim 1 wherein said actuator screw mechanism is powered by a rechargeable battery.

4. The device of claim 1 wherein said actuator screw mechanism is remotely controlled.

5. The device of claim 1 wherein an upstanding handle is secured to said frame to enable the device to be hand-held.

6. The device of claim 5 wherein said handle is generally inverted U-shaped.

7. The device of claim 1 wherein said discharge door engagement structure includes a pivotal latch which engages the outer end of the discharge door for pulling the discharge door from said closed position to said open position.

8. The device of claim 7 wherein said discharge door engagement structure also includes an abutment portion which engages the outer end of the discharge door for pushing the discharge door from said open position to said closed position.

9. The device of claim 8 wherein said spreader mechanism is adapted to apply spreading forces to the openings in said box to decrease binding forces applied to the discharge door by the weight of seed in the box.

10. The device of claim 1 wherein said discharge door engagement structure includes an abutment portion which engages the outer end of the discharge door for pushing the discharge door from said open position to said closed position.

11. In combination:

a bulk seed box having a lower end;

said bulk seed box having a seed discharge opening at said lower end thereof;

said bulk seed box having a horizontally disposed discharge door, having an inner end, an outer end, and opposite sides, slidably mounted at said lower end of said bulk seed box and which is slidably movable between open and closed positions;

said discharge door, when in said closed position, closing said seed discharge opening;

said discharge door, when in said open position, permitting seed to pass downwardly through said seed discharge opening;

said bulk seed box having an opening formed therein at each of said opposite sides of said discharge door;

a hand-held device for opening and closing said discharge door, comprising:

a horizontally disposed generally U-shaped frame having an elongated base portion with horizontally spaced-apart first and second legs extending from the opposite ends of said base portion;

each of said legs having free ends spaced from said base portion;

said free ends of said legs adapted to be inserted into the openings on the seed box at the sides of the sliding discharge door;

a selectively operable spreader mechanism secured to and extending between said legs adjacent said free ends thereof;

an electrically powered screw actuator mechanism mounted on said frame which includes an actuator rod which is parallel to said legs and which is movable between extended and retracted positions;

said actuator rod having an outer end; and discharge door engagement structure at said outer end of said actuator rod for selective engagement with the outer end of the discharge door whereby retraction of said actuator rod will cause the discharge door to be slidably moved to said open position and so that extension of said actuator rod will cause the discharge door to be moved to said closed position.

12. The combination of claim 11 wherein said free ends of said legs have enlarged foot portions.

13. The combination of claim 11 wherein said actuator screw mechanism is powered by a rechargeable battery.

14. The combination of claim 11 wherein said actuator screw mechanism is remotely controlled.

15. The combination of claim 11 wherein an upstanding handle is secured to said frame to enable the device to be hand-held.

16. The combination of claim 15 wherein said handle is generally inverted U-shaped.

17. The combination of claim 11 wherein said discharge door engagement structure includes a pivotal latch which engages the outer end of the discharge door for pulling the discharge door from said closed position to said open position.

18. The combination of claim 17 wherein said discharge door engagement structure also includes an abutment portion which engages the outer end of the discharge door for pushing the discharge door from said open position to said closed position.

19. The combination of claim 18 wherein said spreader mechanism is adapted to apply spreading forces to the openings in said box to decrease binding forces applied to the discharge door by the weight of seed in the box.

20. The combination of claim 11 wherein said discharge door engagement structure includes an abutment portion which engages the outer end of the discharge door for pushing the discharge door from said open position to said closed position.

* * * * *